US009298440B2

(12) United States Patent
Bay et al.

(10) Patent No.: US 9,298,440 B2
(45) Date of Patent: Mar. 29, 2016

(54) INSTALLING SOFTWARE USING MULTIPLE METADATA INTERFACES

(71) Applicant: CA, INC., Islandia, NY (US)

(72) Inventors: John William Bay, Tinley Park, IL (US); Sai Swetha Gujja, Naperville, IL (US)

(73) Assignee: CA, Inc., New York, NY (US)

( * ) Notice: Subject to any disclaimer, the term of this patent is extended or adjusted under 35 U.S.C. 154(b) by 92 days.

(21) Appl. No.: 14/206,425

(22) Filed: Mar. 12, 2014

(65) Prior Publication Data

US 2015/0261516 A1 Sep. 17, 2015

(51) Int. Cl.
*G06F 9/445* (2006.01)
*H04L 29/08* (2006.01)

(52) U.S. Cl.
CPC . *G06F 8/61* (2013.01); *H04L 67/10* (2013.01)

(58) Field of Classification Search
CPC .................................. G06F 8/61; H04L 67/10
USPC ................................................... 717/174, 176
See application file for complete search history.

(56) References Cited

U.S. PATENT DOCUMENTS

| | | | | |
|---|---|---|---|---|
| 7,346,627 B2* | 3/2008 | Ramanathan et al. | ......... | 707/616 |
| 7,716,664 B2* | 5/2010 | Hughes et al. | ............... | 717/175 |
| 8,321,857 B1* | 11/2012 | Prosso et al. | .................. | 717/172 |
| 8,347,263 B1* | 1/2013 | Offer | ............................. | 717/104 |
| 8,577,937 B1* | 11/2013 | Offer | ............................. | 707/821 |
| 8,806,476 B2* | 8/2014 | Kapoor et al. | ................ | 717/175 |
| 2007/0169081 A1* | 7/2007 | Zhao et al. | ..................... | 717/168 |
| 2008/0016143 A1* | 1/2008 | Bumpus et al. | .............. | 709/203 |
| 2009/0235245 A1* | 9/2009 | Andersson | ..................... | 717/172 |
| 2010/0162227 A1* | 6/2010 | Davies et al. | ................. | 717/173 |
| 2011/0246980 A1* | 10/2011 | Fagen et al. | ................... | 717/174 |
| 2012/0023233 A1* | 1/2012 | Okamoto et al. | ............ | 709/226 |

OTHER PUBLICATIONS

"Sending an archive file to others", published in 2010 by IBM in "z/OS V1R12.0 UNIX System Services User's Guide", 2pg.*
CA, Inc., "CA Chorus Software, Manager Release 5.1", http://www.ca.com/us/~/media/Files/ProductBriefs/ca-chorus-software-manaper-release.pdf Feb. 17, 2014, 10 pp.

* cited by examiner

*Primary Examiner* — Ryan Coyer
(74) *Attorney, Agent, or Firm* — Myers Bigel & Sibley, P.A.

(57) ABSTRACT

A method of installing software on a computer system may include storing software for installation on the computer system wherein the software defines elements of metadata required for the installation. A first set of the elements of the metadata required for the installation may be accepted using a first metadata interface, and a second set of the elements of the metadata required for the installation may be accepted using a second metadata interface. More particularly, the first and second sets of the elements of the metadata may be different. The software may be installed using the first and second sets of the metadata.

20 Claims, 4 Drawing Sheets

INSTALLING SOFTWARE USING MULTIPLE METADATA INTERFACES

BACKGROUND

The present disclosure relates to computer systems, and more specifically, to methods of installing software and related computer program products and systems.

Current software installation processes may use a sequential/linear type of setup, meant to be driven solely by a single installer. CA Chorus™ Software Manager (CSM, and formally known as CA Mainframe Software Manager or MSM), for example, is a product used to install software.

As enterprise systems and software become more cross-disciplinary and/or platform independent, common installation schemes may be inefficient. Installation processes may presently require weeks of planning and preparation involving multiple departments of an organization to obtain what usually amounts to a hard copy of an otherwise static form of data required for the SIS (Software Installation Service) metadata used to install a software product. Conventional installation processes may thus lead to missed, overlooked, and/or misunderstood information being provided as SIS (Software Installation Service) metadata, resulting in days/weeks of additional troubleshooting and/or increased complexity of bureaucracy between multiple departments of the organization installing the software.

BRIEF SUMMARY

According to one aspect of the present disclosure, a method of installing software on a computer system may include storing software for installation on the computer system wherein the software defines elements of metadata required for the installation. A first set of the elements of the metadata required for the installation may be accepted using a first metadata interface, and a second set of the elements of the metadata required for the installation may be accepted using a second metadata interface, wherein the first and second sets of the elements of the metadata are different. The software may be installed using the first and second sets of elements of the metadata.

According to another aspect of the present disclosure, a data processing node may include a network interface to communicate through a data network with a remote workstation and a processor circuit coupled to the network interface. The processor circuit may be: to store software for installation on the computer system wherein the software defines elements of metadata required for the installation; to accept a first set of the elements of the metadata required for the installation using a first metadata interface; to accept a second set of the elements of the metadata required for the installation using a second metadata interface, wherein the first and second sets of the elements of the metadata are different; and to install the software using the first and second sets of elements of the metadata.

According to yet another aspect of the present disclosure, a computer program product may provide software installation on a computer system. The computer program product may include a computer readable storage medium comprising computer readable program code embodied therein. The computer readable program code may include: computer readable program code to store software for installation on the computer system wherein the software defines elements of metadata required for the installation; computer readable program code to accept a first set of the elements of the metadata required for the installation using a first metadata interface; computer readable program code to accept a second set of the elements of the metadata required for the installation using a second metadata interface, wherein the first and second sets of the elements of the metadata are different; and computer readable program code to install the software using the first and second sets of elements of the metadata.

According to still another aspect of the present disclosure, a data processing node may include a network interface to communicate through a data network with a remote workstation and a processor circuit coupled to the network interface. The processor circuit may be: configured to store software for installation on the computer system wherein the software defines elements of metadata required for the installation; configured to accept a first set of the elements of the metadata required for the installation using a first metadata interface; configured to accept a second set of the elements of the metadata required for the installation using a second metadata interface, wherein the first and second sets of the elements of the metadata are different; and configured to install the software using the first and second sets of elements of the metadata.

According to still another aspect of the present disclosure, a computer program product may provide software installation on a computer system. The computer program product may include a computer readable storage medium comprising computer readable program code embodied therein. The computer readable program code may include: computer readable program code configured to store software for installation on the computer system wherein the software defines elements of metadata required for the installation; computer readable program code configured to accept a first set of the elements of the metadata required for the installation using a first metadata interface; computer readable program code configured to accept a second set of the elements of the metadata required for the installation using a second metadata interface, wherein the first and second sets of the elements of the metadata are different; and computer readable program code configured to install the software using the first and second sets of elements of the metadata.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1A:
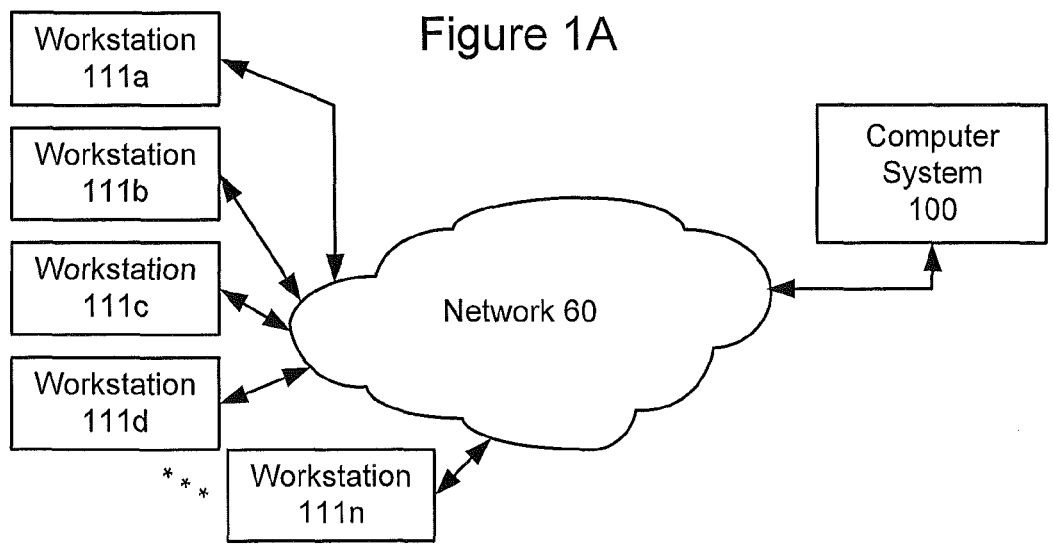
FIG. 1A is a schematic diagram illustrating a network environment including a computer system and workstations according to some embodiments of inventive concepts.

Embodiments of the present disclosure will be described more fully hereinafter with reference to the accompanying drawings. Other embodiments may take many different forms and should not be construed as limited to the embodiments set forth herein. Like numbers refer to like elements throughout.

CA Chorus™ Software Manager (CSM, and formerly known as CA Mainframe Software Manager or MSM), for example, is a product used for software installations. CSM has been implemented in phases. A first phase of CA CSM delivered an initial set of capabilities. These capabilities offer a way to obtain, install, and maintain CA products using IBM's SMP/E (System Modification Program/Extended) maintenance product. A second phase implemented techniques that facilitate deploying the SMP/E maintained product target libraries to one or more specified destination systems that are defined to CSM. A third phase provides an interface to configure products deployed by CSM.

The following table shows components making up CSM and the phase in which each component was included.
Phase 1: UI—User Interface Framework
PAS—Product Acquisition Service
SIS—Software Installation Service
Phase 2: SDS—Software Development Service
Phase 3: SCS—Software Configuration Service The Phase 1 CSM implementation uses metadata needed by the CSM Software Installation Service (SIS). The SIS metadata is used by SIS processing to automate the SMP/E installation process of CA mainframe products. Each SIS enabled product bundles its software along with the SIS metadata files into a POSIX (Portable Operating System Interface) Portable Archive Exchange (PAX) file. CA CSM SIS processing performs an SMP/E base install of the data provided in the PAX file and as directed by the contents of the SIS metadata.

An additional type of CSM metadata was introduced as part of Phase 2. Unlike SIS metadata, the set of SDS metadata files are considered part of the product software, and as such are managed by SMP/E. The files making up SDS metadata describe what components of a product are required and which ones are optional. Additionally, SDS metadata identifies which set of SMP/E target libraries are included when CSM deploys the product.

Some CA products are "deployable" while others, in addition to being "deployable," are also "configurable." An optional piece of SDS metadata indicates to CSM if the "deployable" product is "configurable." This set is used by CA CSM Software Configuration Service (SCS) to configure an instance of the mainframe product.

For a CA product to be installed using CSM, the product's Electronic Software Delivery (ESD) PAX file may be required to contain a complete set of SIS metadata. This complete set of SIS metadata may include each of the following 5 SIS XML metadata files: a PACKAGE.XML file, a DEPLOYMENT.XML file, a SMPESETUP.XML file, a DATASET.XML file, and a SMPEINSTALL.XML file, CSM SIS processing may use these 5 product-specific instance documents during an SIS (Software Installation Service) Base Install of the product to automatically install that product into a new or existing SMP/E environment. The set of SIS instance documents may contain data specific to defining how the product should be installed. These files are not imbedded as part of the SMP/E data, but rather are individual files included as separate elements within the PAX file.

According to some embodiments disclosed herein, multiple users may be allowed to contribute to a software installation at any time, reducing the need for all of the metadata required for installation to be input directly at the time of installation. A smoother pre-installation process may thus be provided, as different subject-matter administrators or experts (e.g., a security administrator, a network administrator, a database administrator, etc.) may all be allowed to directly contribute information (e.g., SIS metadata) used in for a software installation. Embodiments of inventive concepts may also be extended for use to verify installation metadata (also referred to as data) before committing to the entire process of installation, thereby saving additional time of trouble shooting and/or re-running entire installations over a single metadata error. Furthermore, if the installation process uses components of metadata that are common to metadata used for post-installation configuration, embodiments disclose herein may take advantage of this input of metadata to track and later apply configuration(s) for the installed software.

Embodiments of inventive concepts are not limited to a single path leading to installation. Instead of a strictly sequential/linear installation process/layout, different elements of installation metadata/information may be input as soon as the metadata/information is available, and then applied and verified as sections of necessary metadata/information are complete. As a part of this open form of information gathering, multiple users may be defined as a part of the installation process so that the installation automatically gathers the metadata, instead of requiring that the elements of the metadata be passed through meetings or e-mail to a single installer. Additionally, embodiments of inventive concepts may provide a chronicle of documented installation data as a useful reference for future installations of the same software, related software, and/or post-installation configuration. Embodiments of inventive concepts may also allow software engineers to define verification tools that can be leveraged by the installation software, to provide that installations will complete with reduced risk of error.

Methods and systems disclosed herein may first provide portals (also referred to as metadata interfaces, metadata user interfaces, interfaces, etc.) open to administrators or other persons required to provide metadata pertinent to an installation and/or configuration of a given piece of software. This data gathering may be logically separated (e.g., by role, level of authority, etc.), or the data gathering may be fully open to all installers/administrators and locked, maintained, and versioned by the installation administrator of the installation software as well as the installation system itself. During the collection of installation data, there may be milestones whereupon the administrator of the installation system may begin a partial software installation and/or validate the collected installation data. Once the data collection process has been fully completed, the installed software may be validated and installed in its entirety.

Methods and systems of software installation disclosed herein may allow for multiple cross-discipline installers/administrators to provide information relevant to software installation and configuration. Along with this ability, methods and systems of inventive concepts may abstract an order of an installation process, allowing installers/administrators to define installation parameters at leisure.

FIG. 1A is a schematic diagram illustrating a network environment in which software installation on computer system 100 may be provided according to some embodiments of inventive concepts. As shown in FIG. 1A, a plurality of workstations 111a to 111n may be coupled through network 60 (e.g., including one or more of a local area network LAN, a wide area network WAN, the Internet, etc.) with/to computer system (e.g., mainframe computer system) 100 on which software may be installed. Computer system 100, for example, may support multiple software programs for operations of a large enterprise/organization including different departments.

Figure 1B:
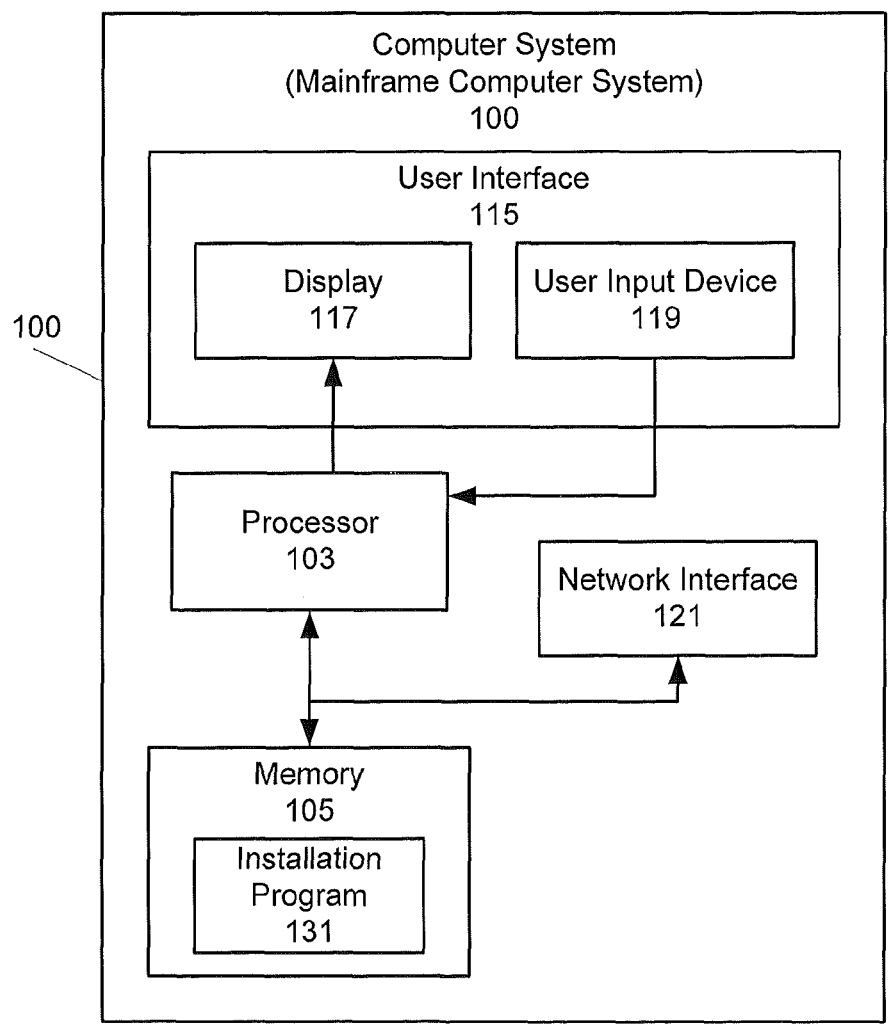
FIG. 1B is a block diagram illustrating a computer system of FIG. 1A.

FIG. 1B is a block diagram of computer system 100 that may be a mainframe computer system used to run different software programs for the enterprise/organization. As shown in FIG. 1B, computer system 100 may include processor 103, memory 105, network interface 121 (providing a communication interface to network 60), and user interface 115. Processor 103, memory 105, network interface 121, and user interface 115 may be connected via a bus or busses. Moreover, an installation program 131 may be stored in memory to support installation of software on computer system 100. Moreover, user interface 115 may be coupled to processor 103 with user interface 115 including display 117 and user input 119 (e.g., a keyboard, mouse, pointing device, etc.). According to some embodiments, user interface 115 and/or elements thereof may be omitted, for example, if user input/output is provided over network 60 through one or more of workstations 111a to 111n.

Figure 1C:
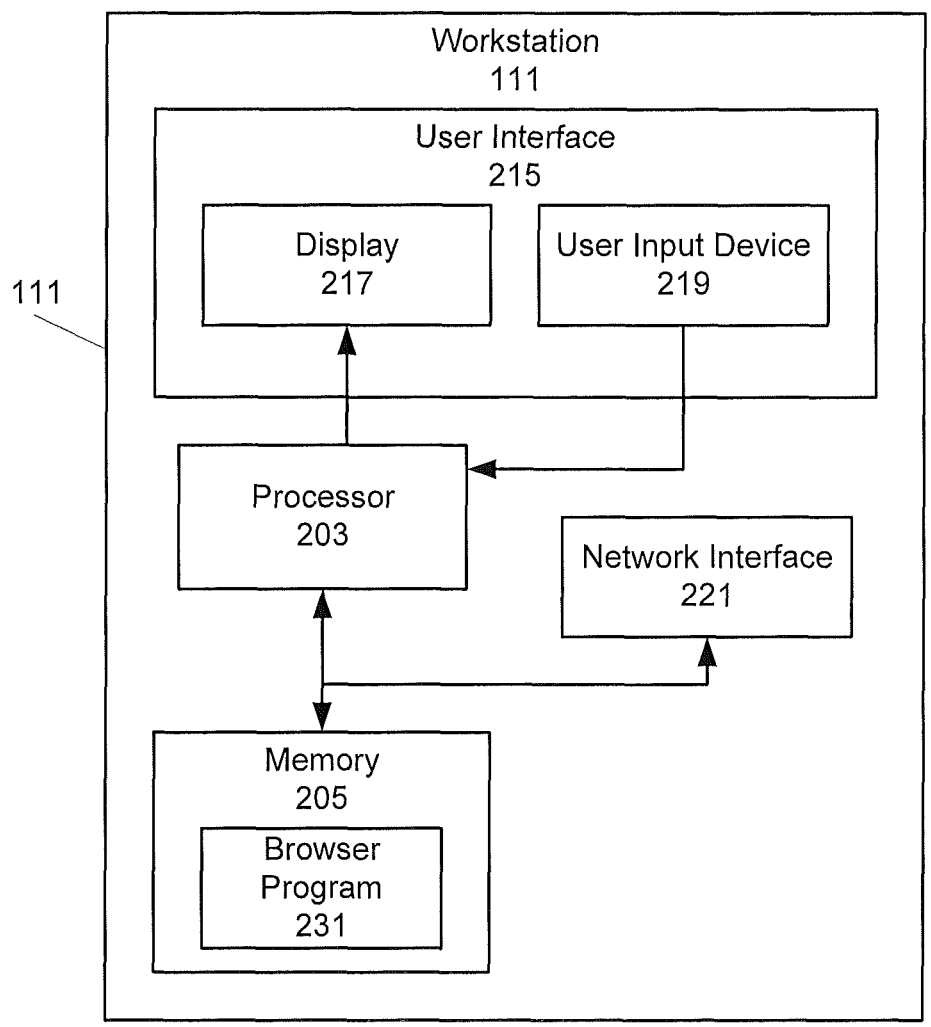
FIG. 1C is a block diagram illustrating a workstation of FIG. 1A.

FIG. 1C is a block diagram of a work station 111 that may provide user input/output to/from computer system 100. Workstation 111, for example, may be a personal computer, a workstation, or any other computing device, capable of executing a browser program 231. Moreover, workstation 111 may include processor 203, memory 205, network interface 221 providing (a communication interface to network 60), and user interface 215. Processor 203, memory 205, network interface 221, and user interface 215 may be connected via a bus or busses. Moreover, browser program 231 (when executed by processor 203) may provide user input/output to/from computer system 100 when installing software using installation program 131 at computer system 100. In addition, user interface 215 may include display 217 and user input 219 (e.g., a keyboard, mouse, pointing device, etc.).

Figure 2:
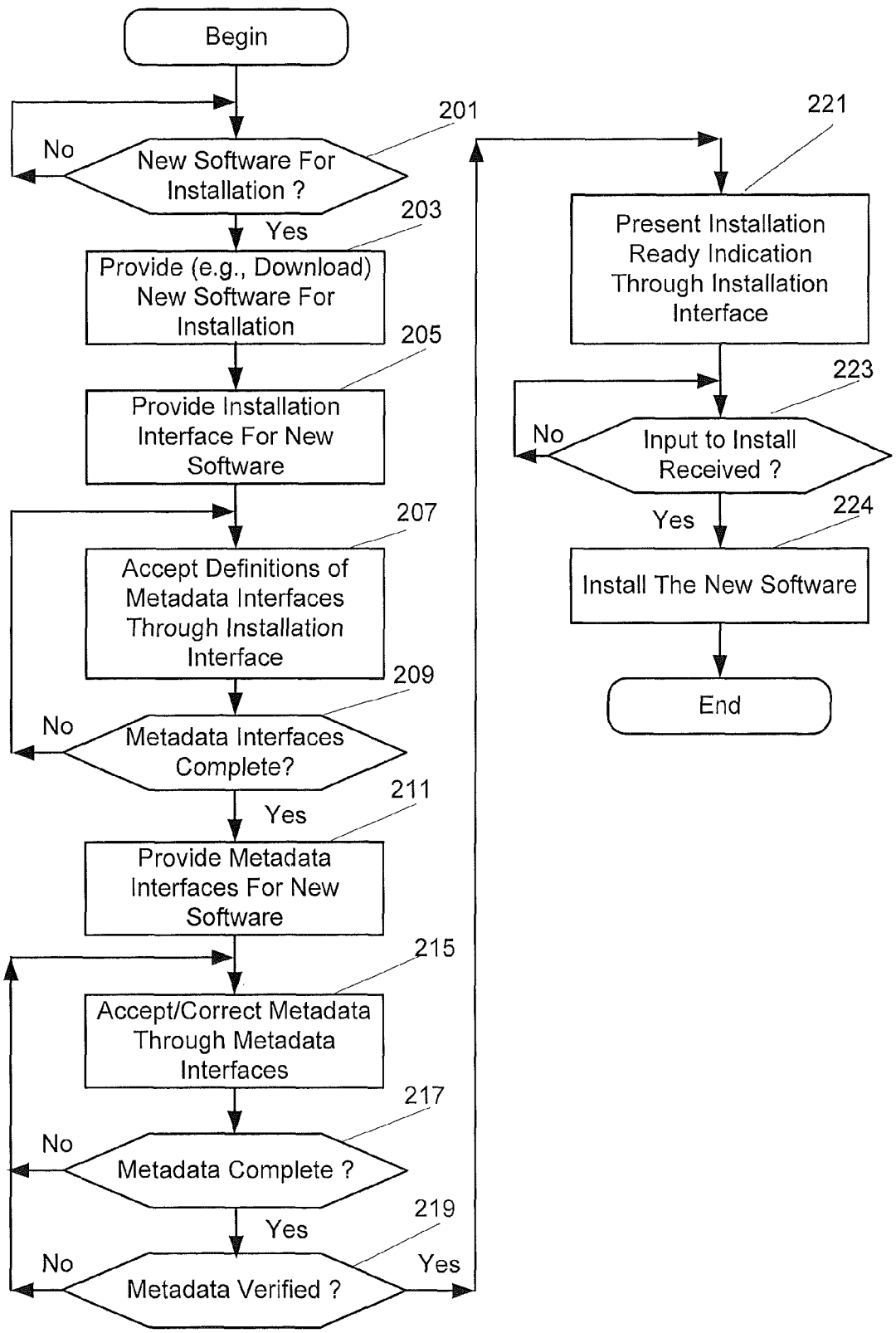
FIGS. 2 and 3 are flow charts illustrating operations of computer system 100 according to some embodiments of inventive concepts.

FIG. 2 is a flow chart illustrating operations of processor 103 of computer system 100 executing installation program 131 in memory 105 to install software on computer system 100. An installation of software may be initiated at block 201 of FIG. 2, for example, responsive to instructions provided by an installation administrator through workstation 111a (e.g., using a browser program), network 60, and network interface 121. At block 203, processor 103 may provide the software for installation, for example, by downloading the software over network 60 and network interface 121 and saving the software in memory 105.

More particularly, the software may define elements of metadata (e.g., elements of SIS metadata) that are required to install the software on computer system 100, and processor 103 may provide an installation interface at block 205 that is used by the installation administrator at workstation 111a to support the installation. More particularly, the installation interface may be accessible at workstation 111a over network 60 through a browser program running at workstation 111a. Moreover, access to the installation interface may be restricted using an user identification (user ID) and an installation password for the installation administrator. Accordingly, access through the installation interface may be restricted to an installation administrator (or administrators) able to provide the correct user identification and password. The installation interface may thus provide a portal allowing an installation administrator to remotely initiate and/or administer the installation of software on computer system 100.

At block 207, processor 103 may accept definitions of metadata interfaces to be used to install the software, and these definitions of the metadata interfaces may be provided by the installer using the installation interface through browser program of workstation 111a. More particularly, the installer may define a plurality of metadata interfaces that are used to obtain metadata for the installation of the software, and a different set of elements of the metadata (required to install the software) may be provided for each metadata interface. By way of example, three metadata interfaces may be provided for the installation of the software including: a security metadata interface used to obtain elements of metadata relating to security (e.g., including an identification used to run the software, a password used to run the software, etc.); a network metadata interface used to obtain elements of metadata relating to network access (e.g., including identifications of network ports to which the software is allowed access); and a database metadata interface used to obtain elements of metadata relating to database access (e.g., including identifications of databases from/to which the software is allowed to read/write data).

In addition, a respective user identification and/or password may be assigned to each metadata interface to restrict access to the respective metadata interface. For example, a user identification and password for a security administrator (or administrators) may be assigned to a security metadata interface, a user identification and password for a network administrator (or administrators) may be assigned to a network metadata interface, and a user identification and password for a database administrator (or administrators) may be assigned to a database metadata interface.

Each metadata interface can thus be used to obtain different elements of the metadata required to install the software. Moreover, each metadata interface may provide a respective user interface (also referred to as a portal) that is accessible over network 60 through a browser program 231 on workstation 111. By way of example, a security administrator may access the security metadata interface using a browser program of workstation 111b (by providing the appropriate user ID and password), a network administrator may access the network metadata interface using a browser program of workstation 111c (by providing the appropriate user ID and password), and a database administrator may access the database metadata interface using a browser program of work station 111d (by providing the appropriate user ID and password). Moreover, the same administrator may use different workstations at different times to enter metadata for the software, and/or different administrators may use the same work station at different times to enter metadata for the software.

Upon completion of the metadata interfaces at block 209, processor 103 may provide the respective metadata interfaces to accept the respective sets of elements of the metadata required to install the software at block 211. By providing the metadata interfaces (e.g., the security, network, and database metadata interfaces), the respective metadata interfaces may be accessed from remote workstations (e.g., workstations 111b, 111c, and 111d) as discussed in greater detail below. While not shown in FIG. 2, the respective administrators may be notified that the metadata interfaces are available for the installation of the software. For example, the installation administrator may notify the other administrators manually (e.g., by telephone, e-mail, text message, etc.) that the respective metadata interfaces are available. According to some other embodiments, processor 103 may generate automatic notifications that are sent to the respective administrators (e.g., by e-mail). If the user IDs and passwords are not known to the administrators, the user IDs and passwords may be provided with the notifications.

Figure 3:
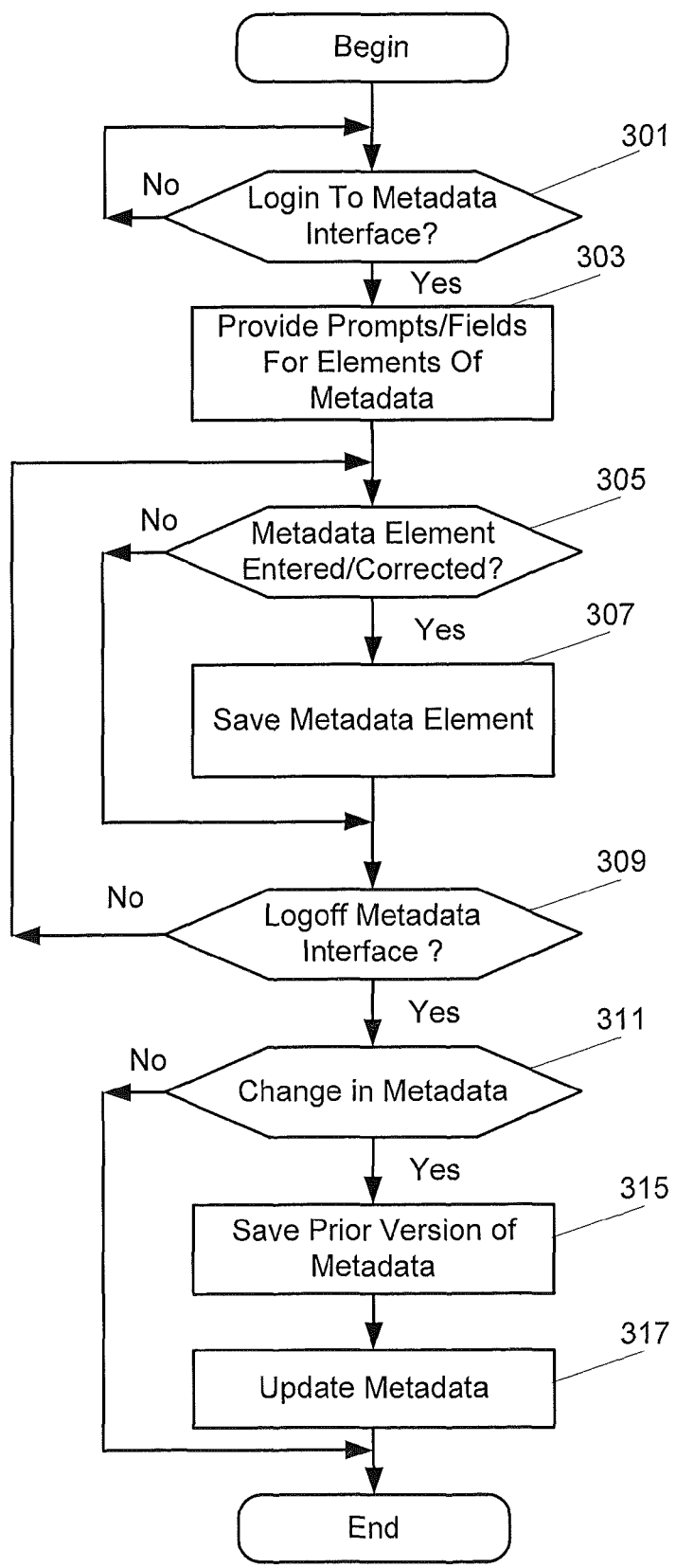

At block 215, processor 215 may accept and/or correct elements of the metadata received through the metadata interfaces as discussed in greater detail below with respect to FIG. 3. Briefly, elements of the metadata may be received independently from the different administrators using the different metadata interfaces. Operations of block 215 may be repeated until the metadata is complete (e.g., all elements of the metadata needed to install the software have been received through the respective metadata interfaces) at block 217 and the metadata is verified (e.g., all elements of the metadata have a proper format) at block 219.

Once all elements of the metadata have been received and verified at blocks 217 and 219, processor 103 may present an installation ready indication through the installation interface at block 221. The installation ready indication, for example, may be provided through on the installation interface together with a button/icon that is used to initiate the installation. In addition, a notification (e.g., an e-mail) separate from the installation interface may be used to alert the installation administrator that installation is ready in the event that the installation administrator is not logged onto the installation interface. Upon receipt of input from the installation administrator to install the software (e.g., by selecting and/or double clicking on the button/icon of the installation interface indicating that the software is ready for installation) at block 223, processor 103 may install the software at block 224.

As noted above, computer system 100 may be a mainframe computer system. Moreover, installing the software may include installing the software using the sets of elements of the metadata (e.g., security metadata, network metadata, and database metadata) using a System Modification Program/Extended (SMP/E) process. Installing the software may further include bundling the sets of elements of the metadata (e.g., security metadata, network metadata, and database metadata) into a Portable Operating System Interface (POSIX) Portable Archive Exchange (PAX) file, and installing the software using the Portable Operating System Interface (POSIX) Portable Archive Exchange (PAX) file including the sets of elements of the metadata. While the bundling may be performed as part of installing at block 224, the bundling (or portions thereof) may be performed during accepting/correcting at block 215, and/or between blocks 215 and 224. Moreover, the Portable Operating System Interface (POSIX) Portable Archive Exchange (PAX) file may include at least one Software Installation Service (SIS) Extensible Markup Language (XML) metadata file, such as, at least one of a PACKAGE.XML file, a DEPLOYMENT.XML file, a SMPESETUP.XML file, a DATASET.XML file, and/or a SMPEINSTALL.XML file.

Operations of accepting and/or correcting elements of the metadata at block 215 will now be discussed in greater detail with respect to the flowchart of FIG. 3. In general, each of the different metadata interfaces may be used by the respective administrators (e.g., security, network, and database administrators) to independently enter the elements of metadata required by the respective metadata interfaces. Moreover, each of the administrators may independently log in to and out of the respective interfaces to enter/correct different elements of the metadata at different times.

By way of example, responsive to the security administrator logging in to the security metadata interface through a browser program of workstation 111b, network 60, and network interface 121, processor 103 may provide the security metadata user interface providing prompts and/or fields to enter elements of metadata relating to security (as defined by the installation administrator) at block 303. Elements of security metadata may be entered and/or corrected at block 305 and saved at block 307 until the security administrator logs off the security metadata user interface at block 309. The security administrator may use one or multiple sessions of the security metadata user interface to enter all elements of the metadata relating to security.

Upon the security administrator logging off at block 309, processor 103 may determine if any change in the security metadata occurred during the session at block 311. If not, processor 103 may return to block 207 of FIG. 2. If the security metadata was changed during the session at block 311, processor 103 may save the prior version of the metadata as a version (also referred to as versioning) at block 315 and update the metadata at block 317 before returning to block 207 of FIG. 2. Accordingly, each intermediate version of the metadata may be saved as a version, and the final updated metadata may be used to install the software.

Responsive to the network administrator logging in to the network metadata interface through a browser program of workstation 111c, network 60, and network interface 121, processor 103 may provide the network metadata user interface providing prompts and/or fields to enter elements of metadata relating to the network (as defined by the installation administrator) at block 303. Elements of network metadata may be entered and/or corrected at block 305 and saved at block 307 until the network administrator logs off the network metadata user interface at block 309. The network administrator may use one or multiple sessions of the network metadata user interface to enter all elements of the metadata relating to the network.

Upon the network administrator logging off at block 309, processor 103 may determine if any change in the network metadata occurred during the session at block 311. If not, processor 103 may return to block 207 of FIG. 2. If the network metadata was changed during the session at block 311, processor 103 may save the prior version of the metadata as a version (also referred to as versioning) at block 315 and update the metadata at block 317 before returning to block 207 of FIG. 2. Accordingly, each intermediate version of the metadata may be saved as a version, and the final updated metadata may be used to install the software.

Responsive to the database administrator logging in to the database metadata interface through a browser program of workstation 111d, network 60, and network interface 121, processor 103 may provide the database metadata user interface providing prompts and/or fields to enter elements of metadata relating to databases (as defined by the installation administrator) at block 303. Elements of database metadata may be entered and/or corrected at block 305 and saved at block 307 until the database administrator logs off the database metadata user interface at block 309. The database administrator may use one or multiple sessions of the database metadata user interface to enter all elements of the metadata relating to databases.

Upon the database administrator logging off at block 309, processor 103 may determine if any change in the database metadata occurred during the session at block 311. If not, processor 103 may return to block 207 of FIG. 2. If the database metadata was changed during the session at block 311, processor 103 may save the prior version of the metadata as a version (also referred to as versioning) at block 315 and update the metadata at block 317 before returning to block 207 of FIG. 2. Accordingly, each intermediate version of the metadata may be saved as a version, and the final updated metadata may be used to install the software.

Using versioning as discussed above, a first element of a set of elements of the metadata (e.g., security metadata) may be accepted using a first logon session of the respective metadata interface (e.g., the security interface), and a first version of the metadata including the first element of the first set of elements of metadata may be generated responsive to accepting the first element of the first set of elements. If a second element of the first set of elements is later accepted during a second (later) logon session of the metadata interface (e.g., the security interface), a second version of the metadata may be generated including the first and second elements of the first set of elements responsive to accepting the second element of the first set of elements, and the first version of the metadata (without the second element) may be maintained.

Using versioning as discussed above, a first element of the first set of elements of the metadata (e.g., security metadata)

may be accepted using a logon session of the respective metadata interface (e.g., the security interface), and a first version of the metadata including the first element of the first set of elements of metadata may be generated responsive to accepting the first element of the first set of elements. If a first element of the second set of elements (e.g., network metadata) is later accepted using a logon session of the respective metadata interface (e.g., the network interface), a second version of the metadata including the first elements of the first and second sets of elements may be generated responsive to accepting the first element of the second set of elements, and the first version of the metadata (without the first element of the second set of elements) may be maintained.

Using versioning as discussed above, a first element of the first set of elements of the metadata (e.g., security metadata) may be accepted using a first logon session of the respective metadata interface, and a first version of the metadata may be generated including the first element of the first set of elements responsive to accepting the first element of the first set of elements. If a change of the first element of the first set of elements is later accepted using a second logon session of the respective metadata interface (e.g., the security interface), a second version of the metadata including the change of the first element of the first set of elements may be generated responsive to accepting the change of the first element of the first set of elements, and the first version of the metadata (without the change of the first element) may be maintained.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be stored in memory and provided to a processor (also referred to as a processor circuit) of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method providing installation of a software product on a computer system, the method comprising:
   storing the software in memory of the computer system for the installation of the software product on the computer system wherein the software product defines elements of metadata required for the installation of the software product on the computer system;
   accepting a first set of the elements of the metadata required for the installation of the software product on the computer system using a first metadata interface, wherein the first metadata interface provides a first user interface accessible over a network through a first browser on a first remote workstation, wherein using the first metadata interface comprises requiring a first login identification and/or password for access to the first user interface used to accept the first set of the elements of the metadata required for the installation of the software product on the computer system;
   accepting a second set of the elements of the metadata required for the installation of the software product on the computer system using a second metadata interface, wherein the first and second sets of the elements of the metadata are different, wherein the second metadata interface provides a second user interface accessible over the network through a second browser on a second remote workstation, wherein the first and second user interfaces are different, wherein using the second metadata interface comprises requiring a second login identification and/or password for access to the second user interface used to accept the second set of the elements of the metadata required for the installation of the software product on the computer system, and wherein the first and second login identifications and/or passwords are different; and
   installing the software product on the computer system using the first and second sets of elements of the metadata.

2. The method of claim 1 wherein the first user interface comprises respective prompts and/or fields for each of the elements of the first set of elements of the metadata, and wherein the second user interface comprises respective prompts and/or fields for each of the elements of the second set of elements of the metadata.

3. The method of Claim 1 wherein the first set of elements of the metadata comprises security elements of the metadata including an identification used to run the software product and a password used to run the software product, and wherein the second set of elements of the metadata comprises network elements of the metadata including identifications of network ports.

4. The method of Claim 1 wherein the first set of elements of the metadata comprises security elements of the metadata including an identification used to run the software product and a password used to run the software product, and wherein the second set of elements of the metadata comprises database elements of the metadata including identifications of databases.

5. The method of Claim 1 wherein the first set of elements of the metadata comprises network elements of the metadata including identifications of network ports, and wherein the second set of elements of the metadata comprise database elements of the metadata including identifications of databases.

6. The method of Claim 1 further comprising:
   responsive to verifying acceptance of all of the first and second sets of the elements of the metadata, presenting an installation ready indication using an installation interface; and
   after presenting the installation ready indication, accepting entry of an installation command through the installation interface, wherein installing the software product comprises installing the software product responsive to the installation command.

7. The method of claim 6 wherein verifying acceptance comprises verifying that all of the first and second sets of elements of the metadata have been entered.

8. The method of Claim 1 wherein accepting the first set of elements comprises,
accepting a first element of the first set of elements,
generating a first version of the metadata comprising the first element of the first set of elements responsive to accepting the first element of the first set of elements,
accepting a second element of the first set of elements, and
generating a second version of the metadata comprising the first and second elements of the first set of elements responsive to accepting the second element of the first set of elements while maintaining the first version of the metadata.

9. The method of Claim 1 wherein accepting the first set of elements comprises, accepting a first element of the first set of elements, and generating a first version of the metadata comprising the first element of the first set of elements responsive to accepting the first element of the first set of elements, and wherein accepting the second set of elements comprises accepting a first element of the second set of elements, and generating a second version of the metadata comprising the first elements of the first and second sets of elements responsive to accepting the first element of the second set of elements while maintaining the first version of the metadata.

10. The method of claim 1 wherein accepting the first set of elements comprises,
accepting a first element of the first set of elements,
generating a first version of the metadata comprising the first element of the first set of elements responsive to accepting the first element of the first set of elements,
accepting a change of the first element of the first set of elements, and
generating a second version of the metadata comprising the change of the first element of the first set of elements responsive to accepting the change of the first element of the first set of elements while maintaining the first version of the metadata.

11. The method of claim 1, wherein the first set of elements of the metadata comprises security elements of the metadata including an identification used to run the software and a password used to run the software, wherein the second set of elements of the metadata comprises network elements of the metadata including identifications of network ports, the method further comprising:
accepting a third set of the elements of the metadata required for the installation of the software product on the computer system using a third metadata interface, wherein the third set of elements of the metadata comprises database elements of the metadata including identifications of databases, wherein the third metadata interface provides a third user interface accessible over the network through a third browser on a third remote workstation, wherein using the third metadata interface comprises requiring a third login identification and/or password for access to the third user interface used to accept the third set of the elements of the metadata required for the installation of the software product on the computer system, wherein the first and third sets of the elements of the metadata are different, wherein the second and third sets of the elements of the metadata are different, wherein the first and third login identifications and/or passwords are different, and wherein the second and third login identifications and/or passwords are different;
wherein installing the software product on the computer system comprises installing the software product on the computer system using the first, second, and third sets of elements of the metadata.

12. The method of claim 11 wherein the computer system comprises a mainframe computer system, and wherein installing the software product comprises installing the software product using the first, second, and third sets of elements of the metadata using a System Modification Program/Extended (SMP/E) process.

13. The method of claim 12 further comprising:
bundling the software product with the first, second, and third sets of elements of the metadata into a Portable Operating System interface (POSIX) Portable Archive Exchange (PAX) file,
wherein installing the software product comprises installing the software product using the Portable Operating System Interface (POSIX) Portable Archive Exchange (PAX) file comprising the first, second, and third sets of elements of the metadata.

14. The method of claim 13 wherein the Portable Operating System interface (POSIX) Portable Archive Exchange (PAX) file comprises a Software Installation Service (SIS) Extensible Markup Language (XML) metadata file.

15. The method of claim 14 wherein the SIS XML metadata file includes a PACKAGE.XML file, a DEPLOYMENT.XML file, a SMPESETUP.XML file, a DATASET.XML file, and/or a SMPEINSTALL.XML file.

16. The method of claim 12 wherein the first, second, and third sets of elements of the metadata comprise first, second, and third sets of elements of Software Installation Service (SIS) metadata.

17. A data processing node of a computer system, the data processing node comprising:
a network interface to communicate through a data network with a plurality of remote workstations; and
a processor circuit coupled to the network interface, the processor circuit being,
to store a software product in memory of the computer system for installation of the software product on the computer system wherein the software product defines elements of metadata required for the installation of the software product on the computer system,
to accept a first set of the elements of the metadata required for the installation of the software product on the computer system using a first metadata interface, wherein the first metadata interface provides a first user interface accessible over the data network through a first browser on a first remote workstation, wherein using the first metadata interface comprises requiring a first login identification and/or password for access to the first user interface used to accept the first set of the elements of the metadata required for the installation of the software product on the computer system,
to accept a second set of the elements of the metadata required for the installation of the software product on the computer system using a second metadata interface, wherein the first and second sets of the elements of the metadata are different, wherein the second metadata interface provides a second user interface accessible over the network through a second browser on a second remote workstation, wherein the first and second user interfaces are different, wherein using the second metadata interface comprises requiring a second login identification and/or password for access to the second user interface used to accept the second set of the elements of the metadata required for the installation of the software product on the computer system, and wherein the first and second login identifications and/or passwords are different, and to install the software product on the computer system using the first and second sets of elements of the metadata.

18. A computer program product providing installation of a software product on a computer system, the computer program product comprising:

a non-transitory computer readable storage medium comprising computer readable program code embodied therein, the computer readable program code comprising:

computer readable program code to store the software product in memory of the computer system for the installation of the software product on the computer system wherein the software product defines elements of metadata required for the installation of the software product on the computer system;

computer readable program code to accept a first set of the elements of the metadata required for the installation of the software product on the computer system using a first metadata interface, wherein the first metadata interface provides a first user interface accessible over a network through a first browser on a first remote workstation, wherein using the first metadata interface comprises requiring identification and/or password for access to the first user interface used to accept the first set of the elements of the metadata required for the installation of the software product on the computer system;

computer readable program code to accept a second set of the elements of the metadata required for the installation of the software product on the computer system using a second metadata interface, wherein the first and second sets of the elements of the metadata are different, wherein the second metadata interface provides a second user interface accessible over the network through a second browser on a second remote workstation, wherein the first and second user interfaces are different, wherein using the second metadata interface comprises requiring a second login identification and/or password for access to the second user interface used to accept the second set of the elements of the metadata required for the installation of the software product on the computer system, and wherein the first and second login identifications and/or passwords are different; and computer readable program code to install the software product on the computer system using the first and second sets of elements of the metadata.

19. The data processing node of claim 17, wherein the first set of elements of the metadata comprises security elements of the metadata including an identification used to run the software and a password used to run the software, wherein the second set of elements of the metadata comprises network elements of the metadata including identifications of network ports, the processor further being, to accept a third set of the elements of the metadata required for the installation of the software product on the computer system using a third metadata interface, wherein the third set of elements of the metadata comprises database elements of the metadata including identifications of databases, wherein the third metadata interface provides a third user interface accessible over the network through a third browser on a third remote workstation, wherein using the third metadata interface comprises requiring a third login identification and/or password for access to the third user interface used to accept the third set of the elements of the metadata required for the installation of the software product on the computer system, wherein the first and third sets of the elements of the metadata are different, wherein the second and third sets of the elements of the metadata are different, wherein the first and third login identifications and/or passwords are different, and wherein the second and third login identifications and/or passwords are different, wherein installing the software product on the computer system comprises installing the software product on the computer system using the first, second, and third sets of elements of the metadata.

20. The computer program product of claim 18, wherein the first set of elements of the metadata comprises security elements of the metadata including an identification used to run the software and a password used to run the software, wherein the second set of elements of the metadata comprises network elements of the metadata including identifications of network ports, the computer readable program code further comprising:

computer readable program code to accept a third set of the elements of the metadata required for the installation of the software product on the computer system using a third metadata interface, wherein the third set of elements of the metadata comprises database elements of the metadata including identifications of databases, wherein the third metadata interface provides a third user interface accessible over the network through a third browser on a third remote workstation, wherein using the third metadata interface comprises requiring a third login identification and/or password for access to the third user interface used to accept the third set of the elements of the metadata required for the installation of the software product on the computer system, wherein the first and third sets of the elements of the metadata are different, wherein the second and third sets of the elements of the metadata are different, wherein the first and third login identifications and/or passwords are different, and wherein the second and third login identifications and/or passwords are different;

wherein installing the software product on the computer system comprises installing the software product on the computer system using the first, second, and third sets of elements of the metadata.

* * * * *